United States Patent
Wong et al.

(10) Patent No.: US 8,279,044 B2
(45) Date of Patent: Oct. 2, 2012

(54) DATA STORAGE DEVICE WITH RADIO FREQUENCY FINGERPRINT SCANNER

(75) Inventors: Kwok Fong Wong, Hong Kong (HK); Pui Yi Ching, Hong Kong (HK)

(73) Assignee: Shining Union Limited, Hong Kong (HK)

( * ) Notice: Subject to any disclaimer, the term of this patent is extended or adjusted under 35 U.S.C. 154(b) by 702 days.

(21) Appl. No.: 12/399,997

(22) Filed: Mar. 9, 2009

(65) Prior Publication Data

US 2010/0090800 A1    Apr. 15, 2010

(30) Foreign Application Priority Data

Oct. 10, 2008   (HK) .................................. 08111267

(51) Int. Cl.
*G05B 19/00* (2006.01)

(52) U.S. Cl. .... 340/5.83; 340/5.8; 340/5.82; 340/815.4; 340/815.45

(58) Field of Classification Search .................. 340/5.8, 340/5.81–5.83, 1.1, 5.1, 5.52, 5.53, 815.4, 340/815.45, 6.1, 540, 691.3; 711/163, E12.091, 711/100, 154; 345/163; 455/41.2; 382/100, 382/115, 124

See application file for complete search history.

(56) References Cited

U.S. PATENT DOCUMENTS

| | | | |
|---|---|---|---|
| 5,399,847 | A | 3/1995 | Droz |
| 6,272,562 | B1 | 8/2001 | Scott et al. |
| 2003/0005336 | A1* | 1/2003 | Poo et al. .................. 713/202 |
| 2006/0140458 | A1* | 6/2006 | Cheng et al. .................. 382/124 |
| 2008/0049984 | A1* | 2/2008 | Poo et al. .................. 382/115 |
| 2008/0261450 | A1* | 10/2008 | Nguyen et al. .................. 439/607 |
| 2009/0154779 | A1* | 6/2009 | Satyan et al. .................. 382/124 |

FOREIGN PATENT DOCUMENTS

| | | |
|---|---|---|
| CN | 2357364 | 1/2000 |
| CN | 1302018 | 7/2001 |
| CN | 2472272 | 1/2002 |
| CN | 2520369 | 11/2002 |
| CN | 2549524 | 5/2003 |
| CN | 1560789 | 1/2005 |
| CN | 2674535 | 1/2005 |
| CN | 2816934 | 9/2006 |
| CN | 1912884 | 2/2007 |
| CN | 2911807 | 6/2007 |
| CN | 2927179 | 7/2007 |
| CN | 101171595 | 4/2008 |
| CN | 201114343 | 9/2008 |

(Continued)

OTHER PUBLICATIONS

Hong Kong Short-term Patent Application No. HK08111266.6 Search Report.

(Continued)

*Primary Examiner* — George Bugg
*Assistant Examiner* — Sisay Yacob

(57) ABSTRACT

A data storage device includes a storage module for storing data, a control module coupled to the storage module for detecting signals and controlling their transmission, an interface coupled to the control module for connecting the data storage device to a periphery device, a radio frequency fingerprint scanning module coupled to the control module for detecting fingerprints and transmitting fingerprint signals to the control module, and a light emitting diode (LED) indicator coupled to the control module to indicate a fingerprint scanning region on the data storage device.

7 Claims, 4 Drawing Sheets

FOREIGN PATENT DOCUMENTS

| | | |
|---|---|---|
| CN | 101320308 | 12/2008 |
| EP | 1107175 | 6/2001 |
| WO | 0152180 | 7/2001 |

OTHER PUBLICATIONS

Hong Kong Short-term Patent Application No. HK08111267.5 Search Report.
Hong Kong Short-term Patent Application No. HK09100803.8 Search Report.
Hong Kong Short-term Patent Application No. HK08113410.7 Search Report.
Hong Kong Short-term Patent Application No. HK08111981.0 Search Report.
Hong Kong Short-term Patent Application No. HK08112026.5 Search Report.
Hong Kong Short-term Patent Application No. HK09102684.8 Search Report.
Hong Kong Short-term Patent Application No. HK08113980.7 Search Report.
Hong Kong Short-term Patent Application No. HK09105479.0 Search Report.

* cited by examiner

DATA STORAGE DEVICE WITH RADIO FREQUENCY FINGERPRINT SCANNER

CROSS-REFERENCE TO RELATED PATENT APPLICATIONS

This patent application claims priority of Hong Kong Short Term Patent Application No. 08111267.5, filed on Oct. 10, 2008, the entire content of which is hereby incorporated by reference.

FIELD OF PRESENT PATENT APPLICATION

The present patent application relates generally to a data storage device and particularly to a data storage device with a radio frequency fingerprint scanner.

BACKGROUND

As technology develops rapidly, information becomes more and more important in our life. People need more information in their daily life and often require media to carry lots of electronic data. Therefore, data storage devices that are small in size, large in storage capacity and ease to use are people's first choice. However, security of data stored in these data storage devices becomes an issue to be considered. Nowadays, encryption software has been adopted to encrypt stored data in these data storage devices. However, the encryption software may not be secure. Firstly, the encryption software may easily be decrypted. Secondly, users can easily forget their passwords. To address these defects, fingerprint encryption technology has been applied in development of data storage devices. In this respect, fingerprint scanning devices are incorporated into data storage devices. One can read/write data in the data storage devices only if the right fingerprint is scanned. Unfortunately, the fingerprint encryption also has certain drawbacks.

There are two kinds of sensors in conventional fingerprint identification devices. The first kind of senor is the pressure sensor having pressure-sensitive elements. The second kind of sensor uses charge-coupled device (CCD)/complementary metal oxide semiconductor (CMOS) to collect fingerprint images by optical principle, and transmits the fingerprint images into a computer for image processing. For the first kind of sensor, the precision of the fingerprint identification device can be affected by the precision and density of distribution of the pressure-sensitive elements. Higher density and more evenly distributed pressure-sensitive elements yield sensors of higher precision. However, the precision of fingerprint identification of this first kind of sensor is not very high. For the second kind of sensor, the precision of the light-sensitive elements in CCD/CMOS lenses can be very high and therefore the precision of fingerprint identification using these CCD/CMOS lenses can also be very high. However, this second kind of sensor is very expensive.

Therefore, there is a need in providing a data storage device with fingerprint scanner that is secure, convenient to use, and not expensive.

The above description of the background is provided to aid in understanding a data storage device with radio frequency fingerprint scanner, but is not admitted to describe or constitute pertinent prior art to the data storage device with radio frequency fingerprint scanner disclosed in the present patent application, or consider any information as material to the patentability of the claims of the present patent application.

SUMMARY

A data storage device includes a storage module for storing data, a control module coupled to the storage module for detecting signals and controlling transmissions of the signals, an interface coupled to the control module for connecting the data storage device to a periphery device, a radio frequency fingerprint scanning module coupled to the control module for detecting fingerprints and transmitting fingerprint signals to the control module, and at least a light emitting diode (LED) indicator coupled to the control module to indicate a fingerprint scanning region on the data storage device.

In the data storage device, the radio frequency fingerprint scanning module may include a sensor which is in the form of a flexible circuit.

In the data storage device, the radio frequency fingerprint scanning module may include an electric field sensor.

The data storage device may include a pair of the LED indicators located at two opposite ends of the radio frequency fingerprint scanning module respectively.

In the data storage device, the interface is a USB interface or an IEEE interface.

In the data storage device, the storage module may be a flash storage device.

In the data storage device, the LED indicator may be adapted to indicate the operation status of the data storage device.

BRIEF DESCRIPTION OF THE DRAWINGS

Specific embodiments of the data storage device with radio frequency fingerprint scanner disclosed in the present patent application will now be described by way of example with reference to the accompanying drawings wherein.

DETAILED DESCRIPTION

Reference will now be made in detail to a preferred embodiment of the data storage device with radio frequency fingerprint scanner disclosed in the present patent application, examples of which are also provided in the following description. Exemplary embodiments of the data storage device with radio frequency fingerprint scanner disclosed in the present patent application are described in detail, although it will be apparent to those skilled in the relevant art that some features that are not particularly important to an understanding of the data storage device with a radio frequency fingerprint scanner may not be shown for the sake of clarity.

Furthermore, it should be understood that the data storage device with radio frequency fingerprint scanner disclosed in the present patent application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 1:
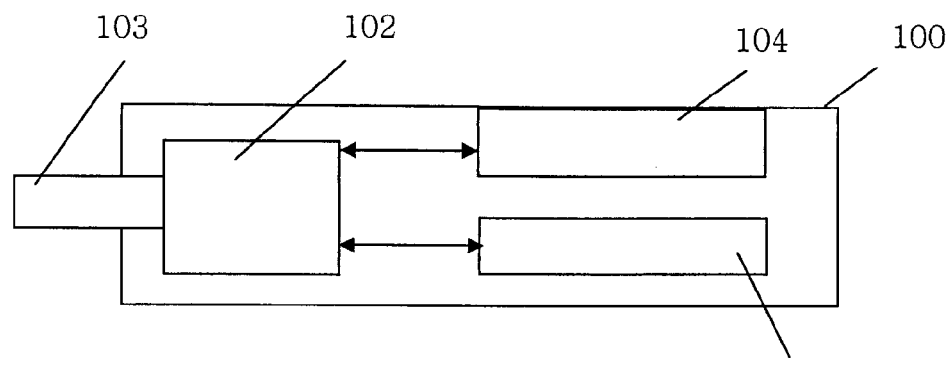
FIG. 1 is a block diagram of the data storage device with radio frequency fingerprint scanner according to an embodiment disclosed in the present patent application.
Figure 4:
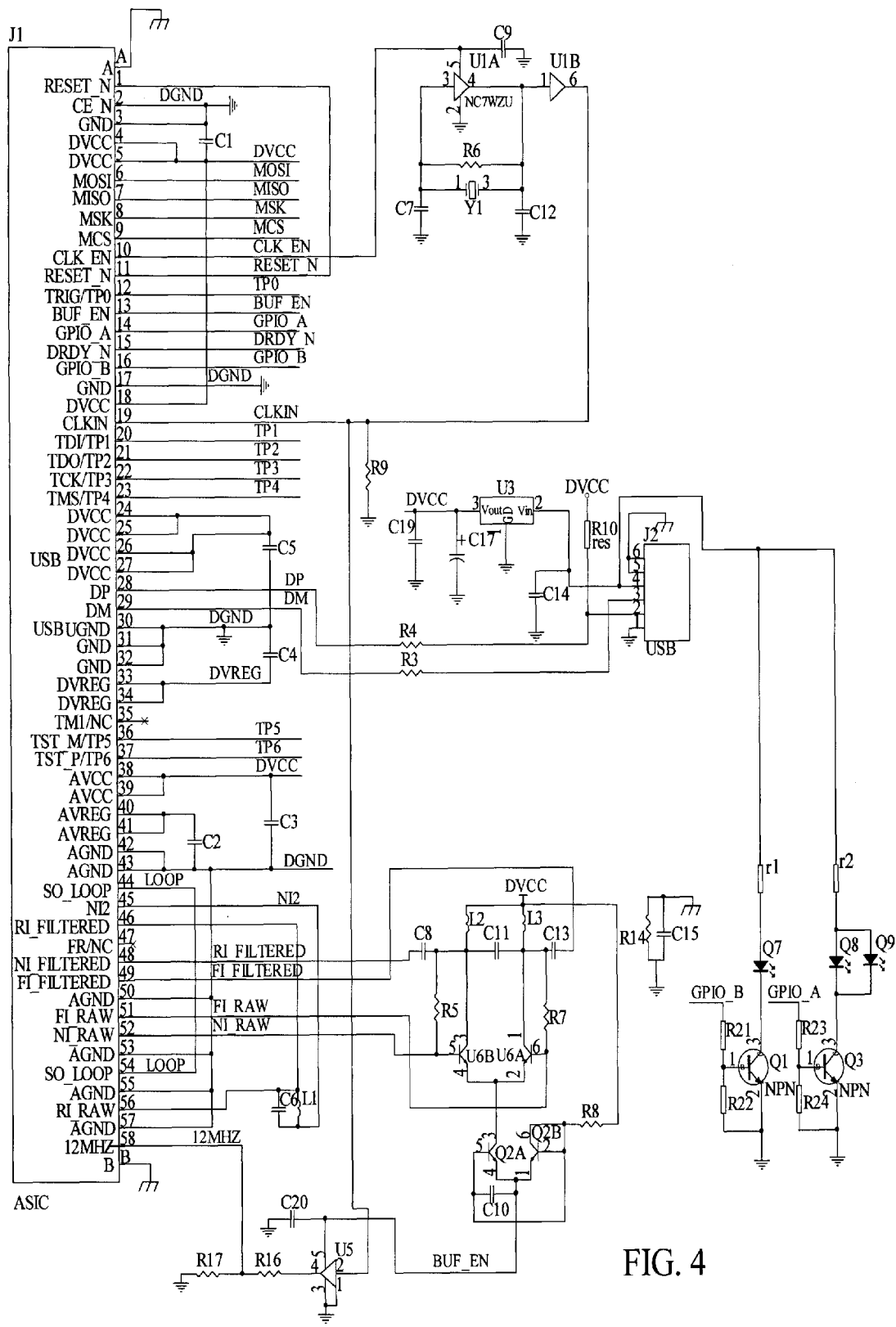
FIG. 4 is a circuit diagram of the data storage device with radio frequency fingerprint scanner according to an embodiment disclosed in the present patent application.

FIG. 1 shows a block diagram of the data storage device with radio frequency fingerprint scanner according to an embodiment disclosed in the present patent application. The data storage device may include a housing 100, a data storage module 101 mounted within the housing 100, a control module 102 coupled to the data storage module 101, an interface 103 coupled to the control module 102, and a radio frequency fingerprint scanning module 104 coupled to the control module 102, and one or more LED indicators 105 coupled to the control module 102 and mounted around the radio frequency fingerprint scanning module 104 to indicate a fingerprint scanning region on the housing 100. A circuit diagram of the data storage device with radio frequency fingerprint scanner according to an embodiment disclosed in the present patent application is shown in FIG. 4.

Figure 3:
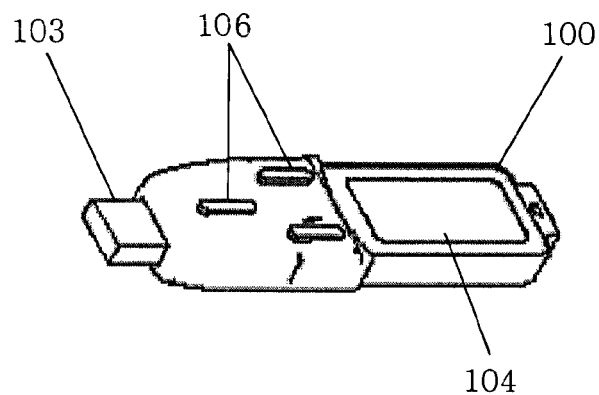
FIG. 3 is a perspective view of the data storage device with radio frequency fingerprint scanner according to an embodiment disclosed in the present patent application.

The housing 100, as depicted in FIG. 3, may be shaped and sized to accommodate therein the data storage module 101, the control module 102, the interface 103, and the radio frequency fingerprint scanning module 104. The housing 100 may be made of plastic or any suitable material.

Figure 7:
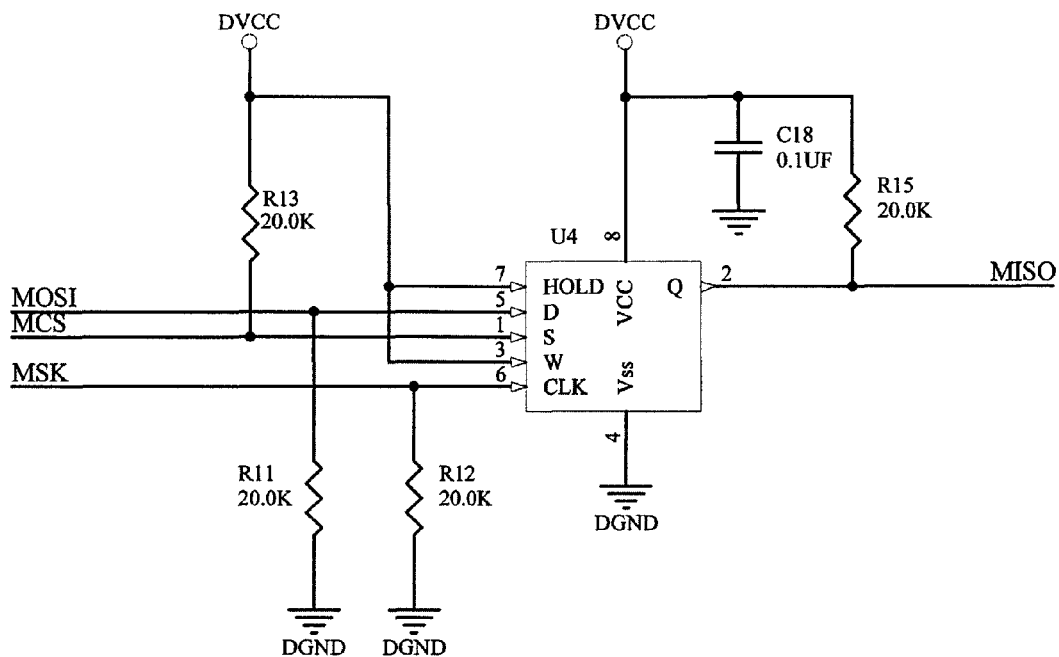
FIG. 7 is a circuit diagram of a data storage module of the data storage device with a radio frequency fingerprint scanner.

The data storage module 101 is coupled to the control module 102 for storing data. The data storage module 101 may be in the form of a flash storage device or any other conventional data storage device. A circuit diagram of a flash storage device of the present patent application is shown in FIG. 7.

The control module 102 may be in the form of a board with electrical circuits formed thereon. The control module 102 can be fixedly mounted inside the housing 100. The control module 102 may include circuits for detecting signals and controlling the transmission of the detected signals. For example, the control module 102 may transmit and receive data to and from the data storage module 101. The control module 102 can receive and process fingerprint signals transmitting from the radio frequency fingerprint scanning module 104 and send the fingerprint signals through the interface 103 to a periphery device such as a computer. The control module 102 can make comparison with the data stored in the data storage module 101 so as to complete fingerprint identification and determine whether read and/or write operations are permitted.

Figure 6:
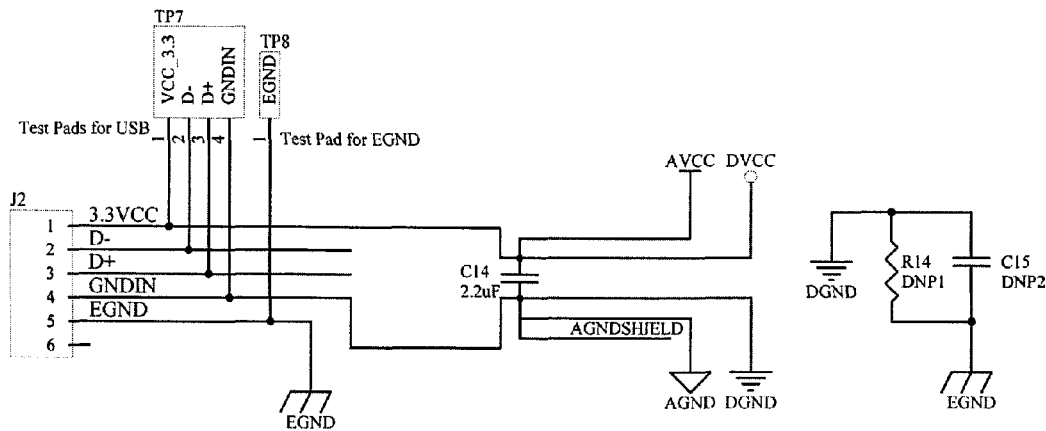
FIG. 6 is a circuit diagram of a USB interface of the data storage device with radio frequency fingerprint scanner.

The interface 103 may be coupled to the control module 102 and provides an interface between the data storage device of the present patent application and a periphery device. The interface 103 may be universal serial bus (USB) interface or any standard interfaces set by IEEE. A circuit diagram of a USB interface 103 of the present patent application is shown in FIG. 6.

Figure 5:
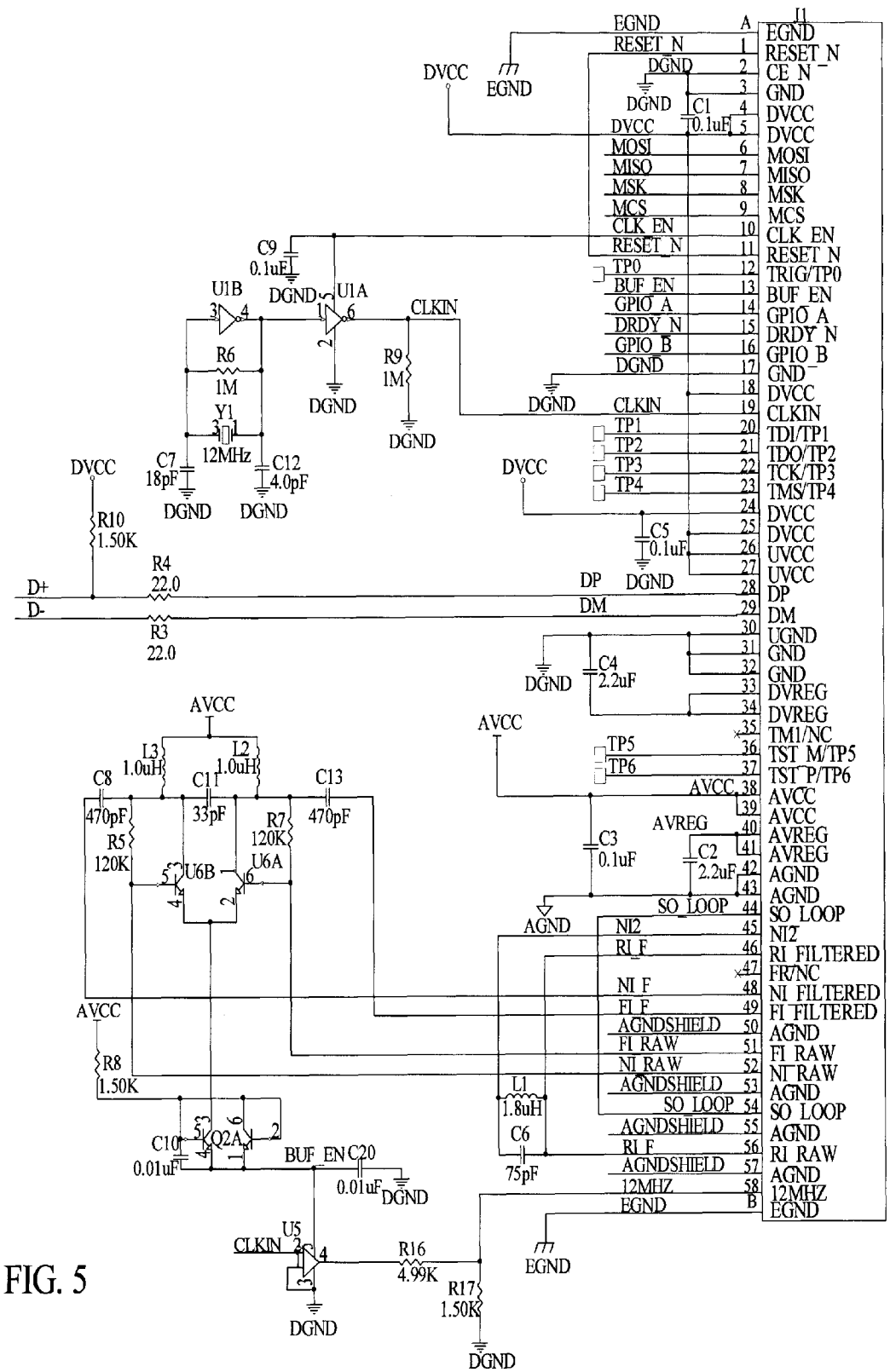
FIG. 5 is a circuit diagram of a radio frequency fingerprint sensor of the data storage device with a radio frequency fingerprint scanner.

The radio frequency fingerprint scanning module 104 can be coupled to the control module 102. The radio frequency fingerprint scanning module 104 may be employed to detect fingerprints and transmit fingerprint signals to the control module 102. The radio frequency fingerprint scanning module 104 may use a flexible circuit as a sensor for detecting fingerprints. A circuit diagram of a fingerprint sensor of the radio frequency fingerprint scanning module 104 is shown in FIG. 5. The size of the radio frequency fingerprint scanning module 104 can be small enough to be accommodated within the housing 100 rendering the data storage device of the present patent application small, lightweight, compact and portable. The use of the radio frequency fingerprint scanning module 104 makes fingerprint scanning faster and more precise.

The radio frequency fingerprint scanning module 104 adopts biometric data sensor technology. Micro electric field sensors developed based on the biometric data sensor technology make a major difference compared to other commonly used fingerprint identification devices. Since objects of different shapes generate different electric fields, a micro electric field sensor can take advantage of this characteristic in fingerprint identification. It can be realized that a micro electric field sensor has many advantages over the previously mentioned pressure sensor and CCD sensor.

Electric field exists everywhere. This gives a micro electric field sensor a so-called "penetration" capacity. Normally, factors such as dust, cut/wound and shallow ridges on a fingerprint would reduce the precision of a fingerprint identification device using pressure sensor or CCD sensor. However, a micro electric field sensor would not be affected by these factors and can "penetrate" the skin and detect even the shape of the bones in a finger.

A larger area of a fingerprint can be collected using an electric field sensor. The electric field sensor not only can collect the part of the fingerprint in direct contact with the sensor on the contacting surface but also the other part of the fingerprint around the contacting surface. This can increase fingerprint data collected and hence can make a fingerprint security system more secure. The use of micro electric field sensor can increase the security and reliability of fingerprint identification. Although the electric field around a finger may be weak and precise detection may be difficult, the existing fingerprint processing technique can satisfy the requirement and ensure satisfactory performance of the fingerprint identification device.

The radio frequency fingerprint scanning system disclosed in the present patent application is more secure, easy to use, and low in manufacturing cost.

Figure 2:
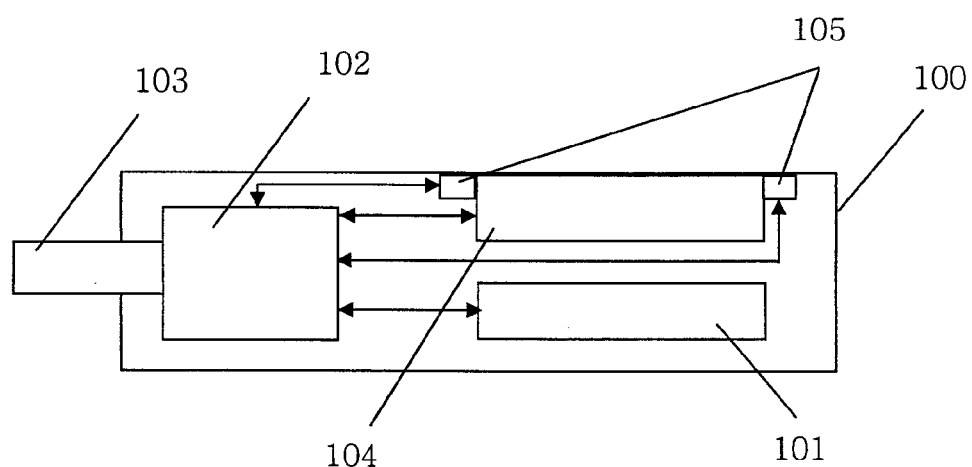
FIG. 2 is a block diagram of the data storage device with radio frequency fingerprint scanner in FIG. 1 with LED indicators for indicating a fingerprint scanning region.

The LED indicators 105 may be employed to indicate a fingerprint scanning region on the housing 100. According to an embodiment illustrated in FIG. 2, two LED indicators 105 may be provided on the housing 100. One of the LED indicators can be provided at one end of the radio frequency fingerprint scanning module 104 and the other one can be provided at the other end of the radio frequency fingerprint scanning module 104 so as to define a fingerprint scanning region on the housing 100.

LED indicators 106 may also be provided to indicate the operation status of the data storage device with radio frequency fingerprint scanner of the present patent application.

While the data storage device with radio frequency fingerprint scanner disclosed in the present patent application has been shown and described with particular references to a number of preferred embodiments thereof, it should be noted that various other changes or modifications may be made without departing from the scope of the appending claims.

What is claimed is:

1. A data storage device comprising: (a) a storage module for storing data; (b) a control module coupled to the storage module for detecting signals and controlling transmissions of the signals; (c) an interface coupled to the control module for connecting the data storage device to a periphery device; (d) a radio frequency fingerprint scanning module coupled to the control module for detecting fingerprints and transmitting fingerprint signals to the control module; (e) a housing which is shaped and sized to accommodate therein the storage module, the control module, the interface, and the radio frequency fingerprint scanning module; and (f) a pair of light emitting diode (LED) indicator coupled to the control module; wherein the pair of LED indicators define a fingerprint scanning region on the housing, and one of the LED indicators is provided at one end of the radio frequency fingerprint scanning module and the other one is provided at the other end of the radio frequency fingerprint scanning module.

2. The data storage device as claimed in claim 1, wherein the radio frequency fingerprint scanning module comprises a sensor in the form of a flexible circuit.

3. The data storage device as claimed in claim 1, wherein the radio frequency fingerprint scanning module comprises an electric field sensor.

4. The data storage device as claimed in claim 1, wherein the interface is a USB interface.

5. The data storage device as claimed in claim 1, wherein the interface is an IEEE interface.

6. The data storage device as claimed in claim 1, wherein the storage module comprises a flash storage device.

7. The data storage device as claimed in claim 1, wherein the LED indicator is adapted to indicate the operation status of the data storage device.

* * * * *